US010718620B2

(12) United States Patent
Wu et al.

(10) Patent No.: US 10,718,620 B2
(45) Date of Patent: Jul. 21, 2020

(54) NAVIGATION AND POSITIONING DEVICE AND METHOD OF NAVIGATION AND POSITIONING

(71) Applicant: INDUSTRIAL TECHNOLOGY RESEARCH INSTITUTE, Hsinchu (TW)

(72) Inventors: Ming-Xuan Wu, New Taipei (TW); Yu-Yin Peng, Hsinchu (TW); Pin-Yung Chen, Hsinchu (TW); Che-Tsung Lin, Hsinchu (TW); Kang Li, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 329 days.

(21) Appl. No.: 15/851,085

(22) Filed: Dec. 21, 2017

(65) Prior Publication Data

US 2019/0086215 A1 Mar. 21, 2019

Related U.S. Application Data

(60) Provisional application No. 62/559,681, filed on Sep. 18, 2017.

(30) Foreign Application Priority Data

Dec. 5, 2017 (TW) .............................. 106142515 A

(51) Int. Cl.
*G01C 21/32* (2006.01)
*G01C 21/30* (2006.01)
*G01C 21/16* (2006.01)
(52) U.S. Cl.
CPC ............. *G01C 21/32* (2013.01); *G01C 21/30* (2013.01)

(58) Field of Classification Search
USPC ........................................................ 701/450
See application file for complete search history.

(56) References Cited

U.S. PATENT DOCUMENTS

| 5,926,113 A | 7/1999 | Jones et al. |
| 6,445,983 B1 | 9/2002 | Dickson et al. |

(Continued)

FOREIGN PATENT DOCUMENTS

| CN | 1490099 A | 4/2004 |
| CN | 101435706 A | 5/2009 |

(Continued)

OTHER PUBLICATIONS

Dai et al., "A Convex Optimization Based Autonomous . . . ," 2016 Intl IEEE Conferences on Ubiquitous Intelligence & Computing, Advanced and Trusted Computing, Scalable Computing and Communications, Cloud and Big Data Computing, Internet of People, and Smart World Congress, 2016, pp. 203-210.

(Continued)

*Primary Examiner* — Tyler D Paige
(74) *Attorney, Agent, or Firm* — Birch, Stewart, Kolasch & Birch, LLP

(57) ABSTRACT

A navigation and positioning device including a storage, a mark feature analyzer, a first coordinate fusion component and a second coordinate fusion component is provided. The storage stores map information including a traffic mark feature and its mark coordinate. The mark feature analyzer is used for analyzing whether a captured image has the traffic mark feature. When the captured image has the traffic mark feature, the mark feature analyzer analyzes the traffic mark feature in the captured image and calculates a device coordinate according to the mark coordinate. The first coordinate fusion component fuses the device coordinate and a first fusion coordinate and uses fused coordinate as a second fusion coordinate. The second coordinate fusion component (Continued)

fuses the second fusion coordinate, traffic carrier inertial information and a global positioning coordinate and uses fused coordinate as an updated first fusion coordinate.

23 Claims, 5 Drawing Sheets

(56) References Cited

U.S. PATENT DOCUMENTS

| | | | |
|---|---|---|---|
| 7,982,591 | B2 | 7/2011 | Jeng et al. |
| 8,725,412 | B2 | 5/2014 | Kobori et al. |
| 8,774,546 | B2 | 7/2014 | Kang et al. |
| 9,082,315 | B2 | 7/2015 | Lin et al. |
| 9,319,667 | B2 | 4/2016 | Lin et al. |
| 9,399,463 | B2 | 7/2016 | Chen et al. |
| 9,489,584 | B2 | 11/2016 | Osanai et al. |
| 9,534,910 | B2 | 1/2017 | Okumura |
| 2009/0228204 | A1* | 9/2009 | Zavoli .................. G01C 21/30 701/532 |
| 2010/0329508 | A1* | 12/2010 | Chen .................. G06K 9/00697 382/103 |
| 2012/0150437 | A1 | 6/2012 | Zeng et al. |
| 2015/0210274 | A1* | 7/2015 | Clarke .................. B60K 31/00 382/104 |
| 2016/0146616 | A1 | 5/2016 | Ren |
| 2017/0025005 | A1 | 1/2017 | Barth et al. |

FOREIGN PATENT DOCUMENTS

| | | |
|---|---|---|
| CN | 103900580 A | 7/2014 |
| JP | 2008-33617 A | 2/2008 |
| JP | 2010-108180 A | 5/2010 |
| JP | 2011-145892 A | 7/2011 |
| TW | I335424 B | 1/2011 |
| TW | I383127 B | 1/2013 |
| TW | I440827 B | 6/2014 |
| TW | I454963 B | 10/2014 |
| TW | I522258 B | 2/2016 |
| TW | I551483 B | 10/2016 |
| TW | I596366 B | 8/2017 |

OTHER PUBLICATIONS

Hata et al., "Feature Detection for Vehicle Localization in Urban Environments Using a Multilayer LIDAR," IEEE Transactions on Intelligent Transportation Systems, vol. 17, No. 2, Feb. 2016, pp. 420-429.

Jiang et al., "Coordinated Control Strategy of On-ramp and Adjacent Intersection," 2013 Third International Conference on Instrumentation, Measurement, Computer, Communication and Control, 2013, pp. 1641-1645.

Jo et al., "Precise Localization of an Autonomous Car Based on Probabilistic Noise Models of Road Surface Marker Features Using Multiple Cameras," IEEE Transactions on Intelligent Transportation Systems, vol. 16, No. 6, Dec. 2015, p. 3377-3392.

Lefèvre et al., "Impact of V2X Privacy Strategies on Intersection Collision Avoidance Systems," 2013 IEEE Vehicular Networking Conference, 2013, pp. 71-78.

Li et al., "A Novel Path Tracking Controller for Ackerman Steering Vehicles," Proceedings of the 32nd Chinese Control Conference, Xi'an, China, Jul. 26-28, 2013, pp. 4177-4182.

Li et al., "Map-Aided GPS/INS Localization Using a Low-Order Constrained Unscented Kalman Filter," ThB12.3, Joint 48th IEEE Conference on Decision and Control and 28th Chinese Control Conference, Shanghai, P.R. China, Dec. 16-18, 2009, 4607-4612.

Matthaei et al., "Map-relative Localization in Lane-Level Maps for ADAS and Autonomous Driving," 2014 IEEE Intelligent Vehicles Symposium (IV), Dearborn, Michigan, USA, Jun. 8-11, 2014, pp. 49-55.

NHTSA, "Crash Factors in Intersection-Related Crashes: An On-Scene Perspective," DOT HS 811 366, Sep. 2010, pp. 1-27 (37 pages total).

Rabe et al., "Ego-lane Estimation for Lane-level Navigation in Urban Scenarios," 2016 IEEE Intelligent Vehicles Symposium (IV), Gothenburg, Sweden, Jun. 19-22, 2016, pp. 896-901.

Rodrigues De Campos et al., "Traffic Coordination at Road Intersections: Autonomous Decision-Making Algorithms Using Model-Based Heuristics," IEEE Intelligent Transportation Systems Magazine, Spring 2017 (Date of Publication Jan. 19, 2017), pp. 8-21.

Rohde et al., "Model-based Derivation of Perception Accuracy Requirements for Vehicle Localization in Urban Environments," 2015 IEEE 18th International Conference on Intelligent Transportation Systems, 2015, pp. 712-718.

Taiwanese Office Action and Search Report dated Jul. 2, 2018 for Application No. 106142515.

\* cited by examiner

NAVIGATION AND POSITIONING DEVICE AND METHOD OF NAVIGATION AND POSITIONING

This application claims the benefit of U.S. provisional application Ser. No. 62/559,681, filed Sep. 18, 2017, the subject matter of which is incorporated herein by reference, and claims the benefit of Taiwan application Serial No. 106142515, filed Dec. 5, 2017, the subject matter of which is incorporated herein by reference

TECHNICAL FIELD

The disclosure relates in general to a navigation and positioning device and a navigation and positioning method using the same, and more particularly to a navigation and positioning device for detecting traffic mark and a navigation and positioning method using the same.

BACKGROUND

Generally speaking, GPS positioning information is an important foundation of navigation. However, in urban areas, satellite signals may easily be shielded by buildings, and the positioning error of an ordinary navigation and positioning device may reach 3 meters and cannot meet the precision requirement of automatic pilot navigation. To increase positioning accuracy, conventional navigation and positioning device needs to employ additional expensive hardware equipment.

Therefore, how to increase positioning accuracy without employing additional expensive hardware equipment has become a prominent task for the industries.

SUMMARY

The disclosure is directed to a navigation and positioning device and a navigation and positioning method using the same capable of resolving the generally known problems disclosed above.

According to one embodiment, a navigation and positioning device including a storage, a mark feature analyzer, a first coordinate fusion component and a second coordinate fusion component is provided. The storage stores map information including a traffic mark feature and its mark coordinate. The mark feature analyzer is used for analyzing whether a captured image has the traffic mark feature. When the captured image has the traffic mark feature, the mark feature analyzer analyzes the traffic mark feature in the captured image and calculates a device coordinate according to the mark coordinate. The first fusion coordinate is fused with the device coordinate by the first coordinate fusion component. The second coordinate fusion component fuses the second fusion coordinate, traffic carrier inertial information and a global positioning coordinate as an updated first fusion coordinate.

According to another embodiment, a navigation and positioning method is provided. The navigation and positioning method includes the following steps. Whether a captured image has a traffic mark feature is analyzed by a mark feature analyzer, wherein the traffic mark feature and a mark coordinate of the traffic mark feature are stored in map information. When the captured image has the traffic mark feature, the mark feature analyzer analyzes the traffic mark feature in the captured image and calculates a device coordinate of the navigation and positioning device according to the mark coordinate. The device coordinate and a first fusion coordinate are fused by a first coordinate fusion component, and the fused coordinate is used as a second fusion coordinate. The second fusion coordinate, traffic carrier inertial information and a global positioning coordinate are fused by a second coordinate fusion component, and the fused coordinate is used as an updated first fusion coordinate.

The above and other aspects of the disclosure will become better understood with regard to the following detailed description of the preferred but non-limiting embodiment(s). The following description is made with reference to the accompanying drawings.

Figure 1:
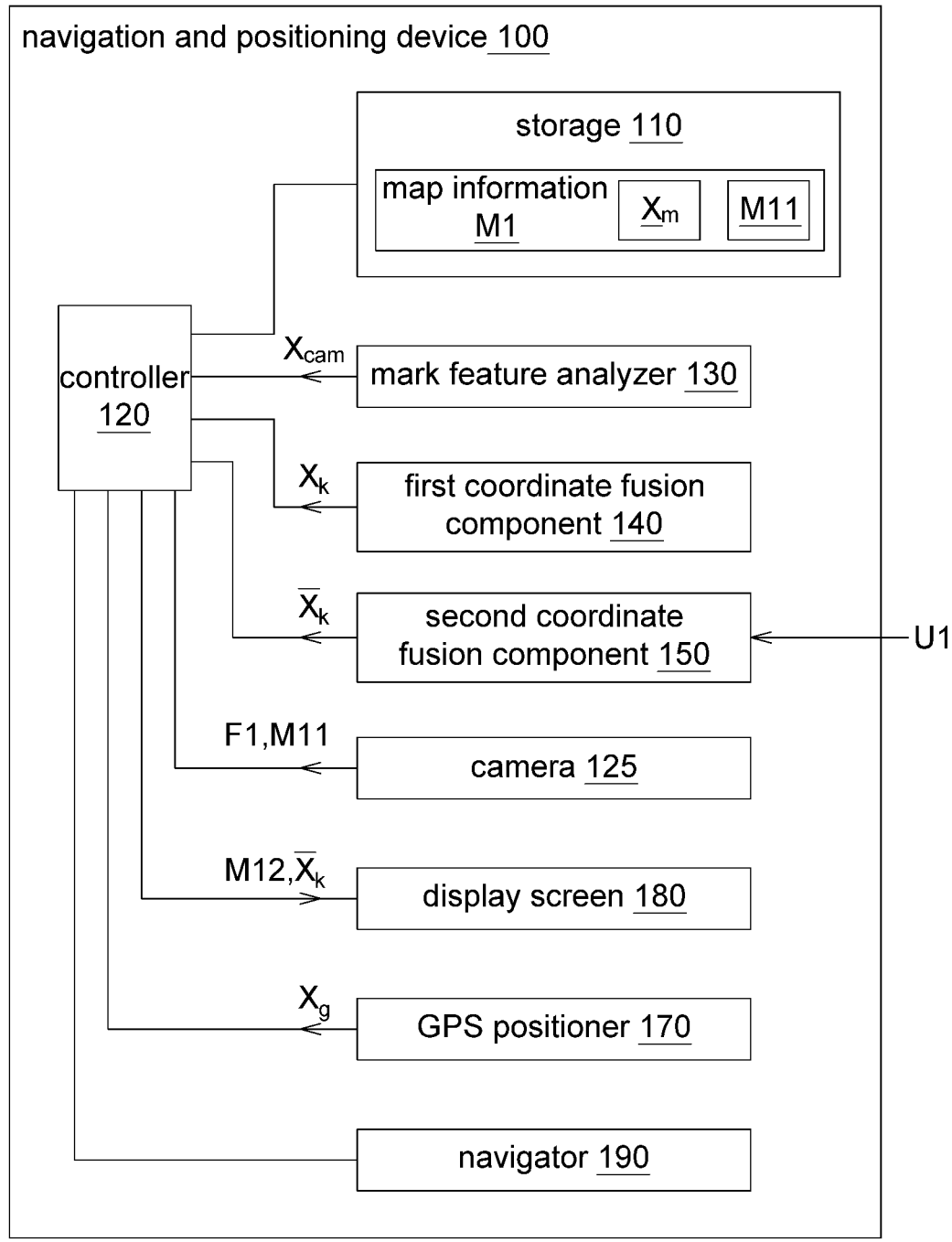
FIG. 1 is a functional block diagram of a navigation and positioning device for detecting traffic mark according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a functional block diagram of a navigation and positioning device 100 for detecting traffic mark according to an embodiment of the disclosure is shown. The navigation and positioning device 100 can be disposed in a traffic carrier C1 (illustrated in FIG. 3), such as a car, a motorbike or any other suitable transportation that travels on the road, for providing a positioning function or a positioning and navigation function.

The navigation and positioning device 100 includes a storage 110, a controller 120, a camera 125, a mark feature analyzer 130, a first coordinate fusion component 140, a second coordinate fusion component 150, a global positioning system (GPS) positioner 170, a display screen 180 and a navigator 190. The controller 120 electrically connects the storage 110, the mark feature analyzer 130, the first coordinate fusion component 140, the second coordinate fusion component 150, the GPS positioner 170 and the display screen 180 for receiving, transmitting, processing and controlling the signals and/or data of the said elements. The controller 120 can load in map information M1 and control the display screen 180 to display the map information M1 and the coordinate of the navigation and positioning device 100.

At least one of the storage 110, the controller 120, the camera 125, the mark feature analyzer 130, the first coordinate fusion component 140, the second coordinate fusion component 150, the GPS positioner 170 and the navigator 190 can be realized by a physical circuit structure formed of semi-conductor. In an embodiment, at least two of the storage 110, the controller 120, the camera 125, the mark feature analyzer 130, the first coordinate fusion component 140, the second coordinate fusion component 150, the GPS positioner 170 and the navigator 190 can be integrated as a single circuit structure.

The storage 110 stores map information M1. In the present embodiment, the map information M1 further includes multiple traffic mark features M11 and their mark coordinates $X_m$ in addition to the road information. In the present specification, the coordinate refers to the latitudes and altitudes of the earth. The traffic mark feature M11 is the feature of traffic mark on the road surface. The traffic mark on the road surface can be a mark close to an intersection. For example, the traffic mark on the road surface is at least one of a zebra crossing, a stop line, a turn zone, a parking grid and an arrow, or other generally known traffic marks. In another embodiment, the traffic mark feature M11 can be located at a location other than the intersection. Moreover, the map information M1 can be stored in the storage 110.

The camera 125 is used for capturing a captured image F1 of the front vision of the traffic carrier C1 for the mark feature analyzer 130 to analyze. The mark feature analyzer 130 is used for analyzing whether the captured image F1 has the traffic mark feature M11. When the captured image F1 has the traffic mark feature M11, the mark feature analyzer 130 analyzes the traffic mark feature M11 in the captured image F1 and calculates the device coordinate $X_{cam}$ of the navigation and positioning device 100 according to the mark coordinate $X_m$. The first coordinate fusion component 140 is used for fusing the device coordinate $X_{cam}$ and a first fusion coordinate $\overline{X}_K$ and using the fused coordinate as a second fusion coordinate $X_k$. The second coordinate fusion component 150 is used for fusing the second fusion coordinate $X_k$, the traffic carrier inertial information U1 and a global positioning coordinate $X_g$ and using the fused d coordinate as an updated first fusion coordinate $\overline{X}_K$. Besides, the traffic carrier inertial information U1 can be provided by an inertial measurement unit (IMU) of the traffic carrier C1.

The camera 125 can be disposed in the navigation and positioning device 10. In another embodiment, the camera 125 can be disposed in the traffic carrier C1, and the captured image F1 can be transmitted to the navigation and positioning device 100 through cabled or wireless transmission.

Since the device coordinate $X_{cam}$ includes relative coordinates between the navigation and positioning device 100 and the traffic mark feature M11, the device coordinate $X_{cam}$ calculated by the navigation and positioning device 100 is closer to the actual coordinate of the navigation and positioning device 100. Thus, the navigation and positioning device 100 of the disclosure can, without employing expensive hardware equipment, achieve the same positioning accuracy as that achieved by expensive hardware equipment. In an embodiment, the navigation and positioning device 100 of the disclosure can increase the positioning accuracy to centimeter level without employing expensive hardware equipment.

Besides, the GPS positioner 170 is used for receiving and calculating GPS satellite signals to obtain a current (contemporary or most updated) global positioning coordinate $X_g$ of the navigation and positioning device 100. The display screen 180 can display the first fusion coordinate $\overline{X}_K$ on the map M12 (illustrated in FIG. 3) of the map information M1 related to the first fusion coordinate $\overline{X}_K$, so that the driver can obtain the position of the traffic carrier C1 in the map M12 (referred as "map position" hereinafter) through the map M12 and the first fusion coordinate $\overline{X}_K$ displayed on the screen.

Figure 2A:
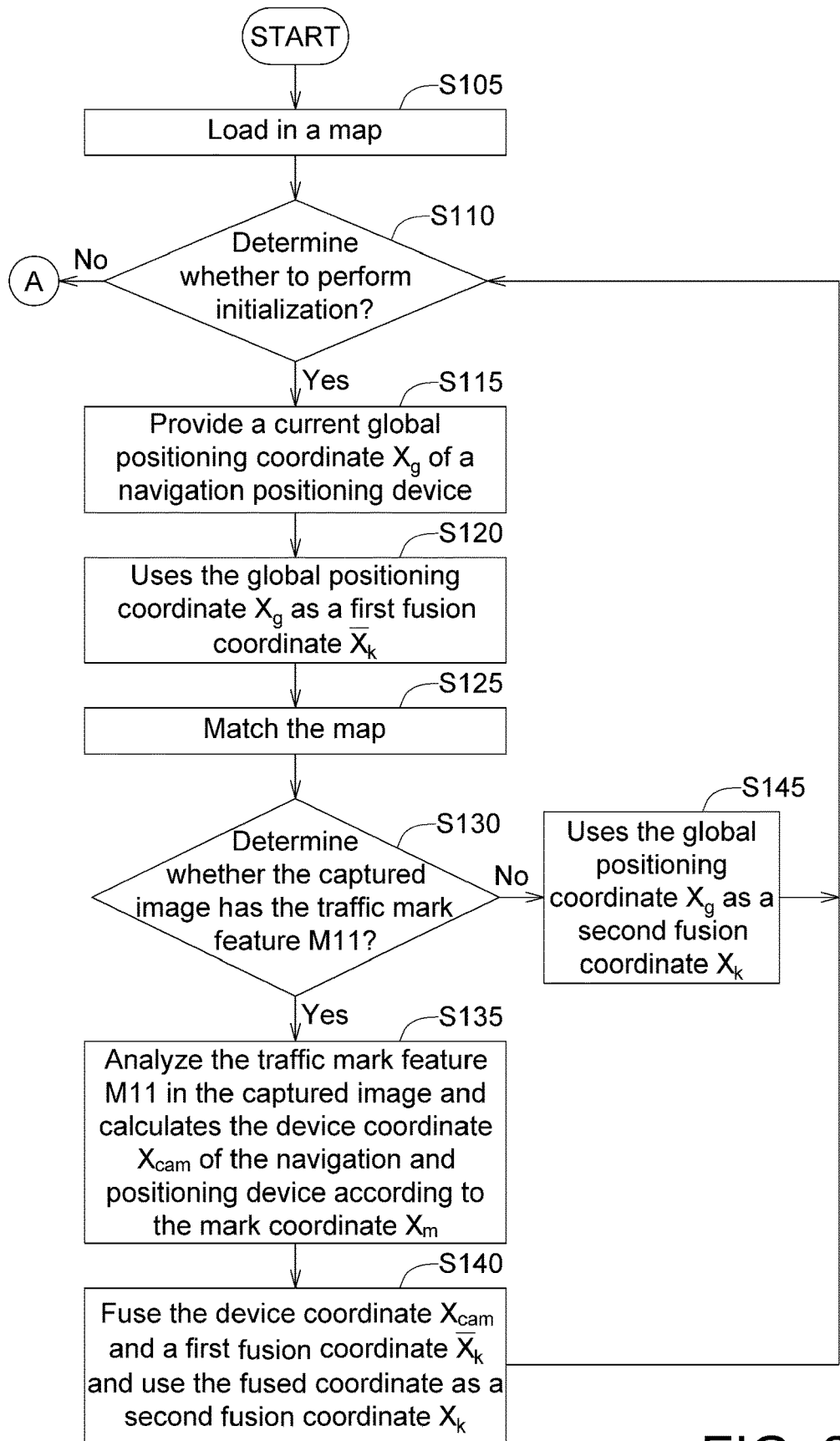
FIGS. 2A and 2B are positioning flowcharts using a navigation and positioning device according to an embodiment of the disclosure.
Figure 2B:
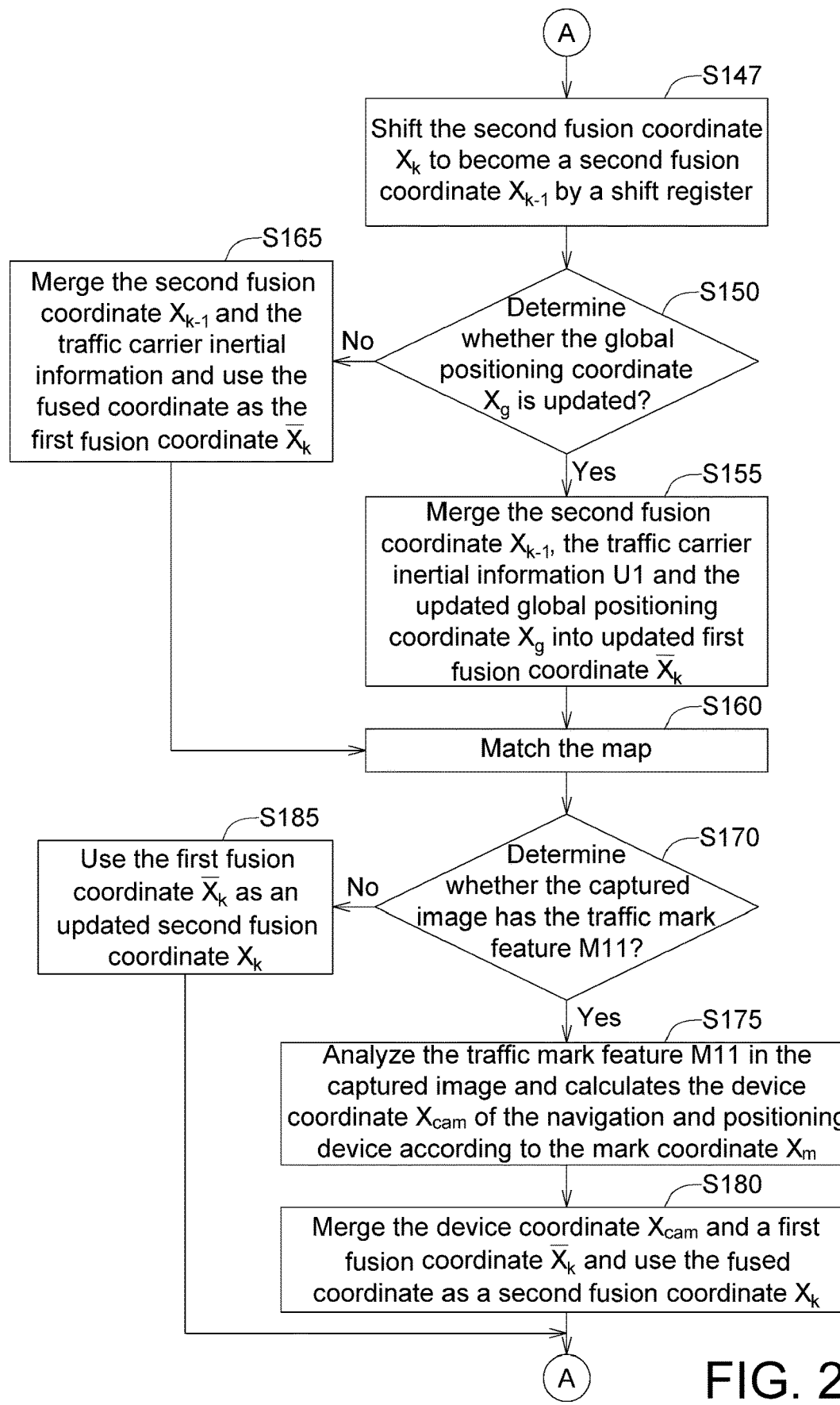

Referring to FIGS. 2A and 2B, positioning flowcharts using a navigation and positioning device 100 according to an embodiment of the disclosure are shown.

In step S105, the controller 120 loads in the map information M1 and controls the display screen 180 to display the map information M1. In the present embodiment, the map information M1 further includes multiple traffic mark features M11 and their mark coordinates $X_m$ in addition to the road information.

In step S110, the controller 120 determines whether to perform an initialization process. When the navigation and positioning device 100 is started up but the first positioning is not completed, the navigation and positioning device 100 is not initialized and starts to perform a first positioning (initialization). When the navigation and positioning device 100 is just started up and the second fusion coordinate $X_k$ is obtained, this indicates that initialization is completed. When initialization is not completed, the method proceeds to step S115. The process of steps S115 to S140 or steps S115 to S145 is referred as an "initialization process". When the initialization process is already completed, the method proceeds to step S150.

In step S115, in the initialization process, the GPS positioner 170 provides a current global positioning coordinate $X_g$.

In step S120, the controller 120 uses the global positioning coordinate $X_g$ as the first fusion coordinate $\overline{X}_K$.

Figure 3:
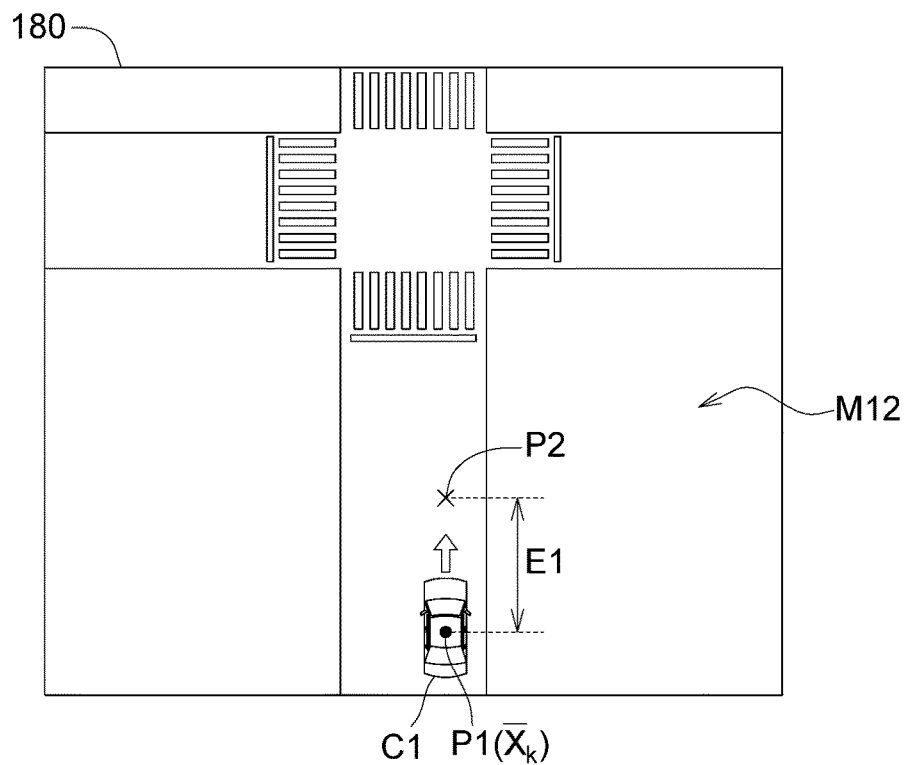
FIG. 3 is a frame of the display screen of FIG. 1 showing a map according to an embodiment of the disclosure.

In step S125, referring to FIG. 3, a frame of the display screen 180 of FIG. 1 showing a map M12, the controller 120 matches the map M12 and a first fusion coordinate $\overline{X}_K$ and controls the display screen 180 to display the first fusion coordinate $\overline{X}_K$ on the map M12, so that the driver can view the map position P1 of the traffic carrier C1 through the map M12.

Due to many other factors, the coordinate calculated according to the GPS still has positioning error, and positioning error E1 exists between the map position P1 of the traffic carrier C1 (or the navigation and positioning device 100) on the map M12 and the actual position P2 of the traffic carrier C1. Moreover, as the traffic carrier C1 proceeds, the positioning error will be accumulated and expanded to the original error of the GPS positioner 170. However, the positioning method of the disclosure embodiment can reduce the positioning error E1, and detailed descriptions are disclosed below.

Figure 4:
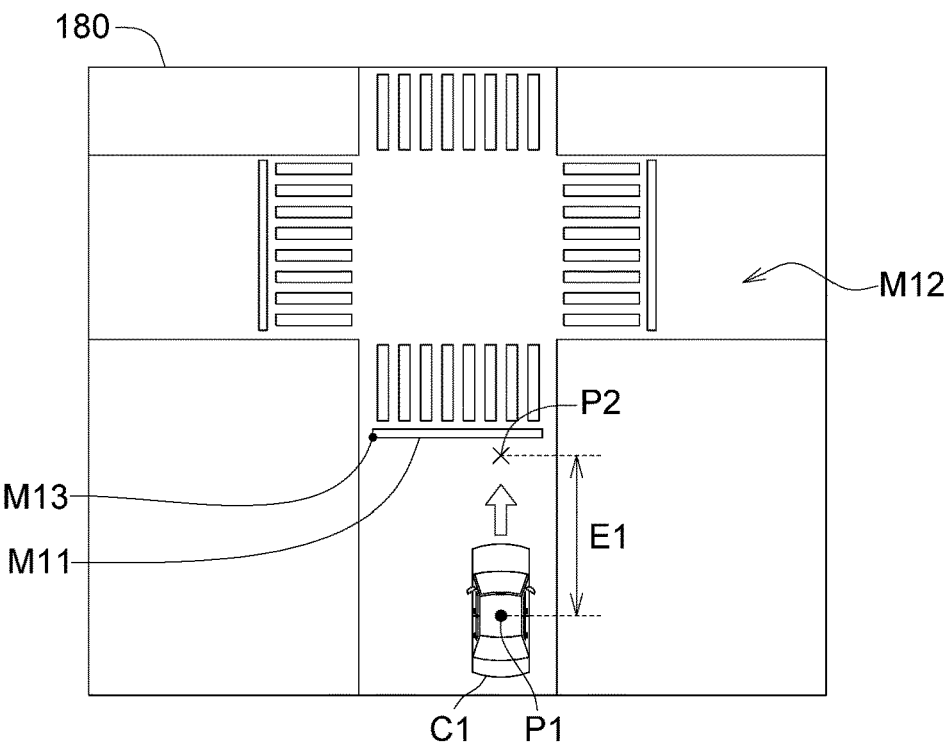
FIG. 4 is a frame of the display screen of FIG. 3 showing a traffic carrier approaching an intersection according to an embodiment of the disclosure.

In step S130, referring to FIG. 4, a frame of the display screen 180 of FIG. 3 showing a traffic carrier C1 approaching an intersection (for example, traffic carrier C1 stops at the intersection or passes through the intersection), the controller 120 determines whether the traffic carrier C1 approaches the intersection according to a current global positioning coordinate $X_g$ and the map information M1 of the traffic carrier C1. The mark feature analyzer 130 starts to analyze the captured image F1 of the camera 125 and determine whether the captured image F1 has the traffic mark feature M11 only when the traffic carrier C1 approaches the intersection. Therefore, the mark feature analyzer 130 will not occupy too much analysis resource of the system. In another embodiment, no matter the traffic carrier C1 approaches the intersection or not, the mark feature analyzer 130 continuously analyzes the captured image F1 and continuously determines whether the captured image F1 has the traffic mark feature M11.

In the present step, when the captured image F1 has the traffic mark feature M11, the method proceeds to step S135; otherwise, the method proceeds to step S145.

In step S135, the mark feature analyzer 130 analyzes the traffic mark feature M11 in the captured image F1 and calculates the device coordinate $X_{cam}$ of the navigation and positioning device 100 according to the mark coordinate $X_m$. In an embodiment, the mark feature analyzer 130 calculates relative distance and angle between the navigation and positioning device 100 and the feature point M13 according to the feature point M13 of the traffic mark feature M11. And then the mark feature analyzer 130 calculates the device coordinate $X_{cam}$ of the navigation and positioning device 100 according to the relationship of relative position. The mark coordinate $X_m$ is, for example, the coordinate of the feature point M13. Besides, a traffic mark feature M11 can have at least a feature point M13. The feature point M13 can be a corner point and/or a point (such as a middle point) at a boundary of the traffic mark feature M11. In an embodiment, the mark feature analyzer 130 calculates the device coordinate $X_{cam}$ using the deep learning object detection technology according to the traffic mark feature M11.

In step S140, the first coordinate fusion component 140 fuses the device coordinate $X_{cam}$ and a first fusion coordinate $\overline{X}_K$ using the Kalman filter technique (the first fusion coordinate $\overline{X}_K$ in the initialization process is the global positioning coordinate $X_g$) and uses the fused coordinate as a second fusion coordinate $X_k$. Then, the method proceeds to step S110.

In step S140, the first coordinate fusion component 140 calculates the second fusion coordinate $X_k$ according to formulas (1)-(3). The Kalman gain K1 of formula (2) is calculated according to the first fusion coordinate $\overline{X}_K$, $Q_{cam}$ and R, wherein $Q_{cam}$ denotes a traffic carrier model covariance matrix, and R denotes a measurement covariance matrix. Both the traffic carrier model covariance matrix $Q_{cam}$ and the measurement covariance matrix R are formed of constants.

$$D1 = (X_{cam} - \overline{X}_K) \tag{1}$$

$$K1 = P(\overline{X}_K, Q_{cam}, R) \tag{2}$$

$$X_k = \overline{X}_K + K1 \times D1 \tag{3}$$

In the initialization process, the first fusion coordinate $\overline{X}_K$ of formula (1) is the global positioning coordinate $X_g$. In the initialization process, when the captured image F1 has the traffic mark feature M11, the device coordinate $X_{cam}$ and a first fusion coordinate $\overline{X}_K$ (that is, the global positioning coordinate $X_g$) are not the same. Therefore, the device coordinate $X_{cam}$ of formula (1) and the first difference D1 of the first fusion coordinate $\overline{X}_K$ are not equivalent to 0. In formula (2), the Kalman gain K1 is not equivalent to 0. Therefore, in the initialization process, such as formula (3), a new second fusion coordinate $X_k$ different from the first fusion coordinate $\overline{X}_K$ (that is, the global positioning coordinate $X_g$) is obtained. Additionally, in the disclosure, the actual value of the Kalman gain K1 is not subjected to any specific restrictions and can be adjusted according to actual situations.

In step S145, when the determination in step S130 is negative (that is, the captured image F1 does not have the traffic mark feature M11), the controller 120 sets the global positioning coordinate $X_g$ as a second fusion coordinate $X_k$. Then, the method proceeds to step S110.

In step S145, judging from formulas (1)-(3), in the initialization process, when the captured image F1 does not have the traffic mark feature M11, the second coordinate fusion component 150 sets the first difference D1 as 0. Therefore, the second fusion coordinate $X_k$ obtained from formula (3) and the first fusion coordinate $\overline{X}_K$ (that is, the global positioning coordinate $X_g$ in the initialization process) are the same.

As indicated in FIG. 2A, following steps S140 and S145, the method proceeds to step S110. In step S110, the method proceeds to the step S150 of FIG. 2B because the initialization process is already completed. The steps following step S150 are referred as the "non-initialization process".

Before the method proceeds to step S150, the method can perform step S147 first. In step S147, the controller 120 allows the second fusion coordinate $X_k$ to be processed by a shift register (not illustrated) and become a second fusion coordinate $X_{k-1}$, being the coordinate of the second fusion coordinate $X_k$ shifted to the previous timing.

In step S150, the controller 120 determines whether the global positioning coordinate $X_g$ of the GPS positioner 170 is updated. In other words, the GPS positioner 170 has a fixed receiving frequency, and when the fixed receiving frequency does not synchronize with the processing frequency of the controller 120 (for example, the processing frequency of the controller 120 is greater than the fixed receiving frequency), the global positioning coordinate $X_g$ is not necessarily updated in each non-initialization process. When the global positioning coordinate $X_g$ is already updated, the method proceeds to step S155; otherwise, the method proceeds to step S165.

In step S155, since the global positioning coordinate $X_g$ is updated, the second coordinate fusion component 150 fuses the second fusion coordinate $X_{k-1}$, the traffic carrier inertial information U1 and the updated global positioning coordinate $X_g$ and uses the fused coordinate as an updated first fusion coordinate $\overline{X}_K$. Then, the method proceeds to step S160.

In step S155, the second coordinate fusion component 150 calculates the first fusion coordinate $\overline{X}_K$ according to formulas (4)-(7). In formulas (4)-(7), the Kalman gain K2 is calculated according to the second fusion coordinate $X_{k-1}$, an intermediate output value X', and parameters Q and R, and is not subjected to any specific restrictions. Wherein, the parameter Q denotes a traffic carrier model covariance matrix, and the parameter R denotes a measurement covariance matrix. The traffic carrier model covariance matrix $Q_{cam}$ and the measurement covariance matrix R both are formed of constants. The traffic carrier model covariance matrix Q and the traffic carrier model covariance matrix $Q_{cam}$ are not the same. In an embodiment, the traffic carrier model covariance matrix Q and the traffic carrier model covariance matrix $Q_{cam}$ are dependent with each other. For example, the traffic carrier model covariance matrix Q and the traffic carrier model covariance matrix $Q_{cam}$ can be expressed as: $Q_{cam} = S \times Q$, wherein the coefficient S ranges between 0 and 1. In another embodiment, the traffic carrier model covariance matrix Q and the traffic carrier model covariance matrix $Q_{cam}$ can be independent of each other.

$$X' = f(X_{k-1}, U1) \tag{4}$$

$$D2 = (X_g - X') \tag{5}$$

$$K2 = P(X_k, X', Q, R) \tag{6}$$

$$\overline{X}_K = X' + K2 \times D2 \tag{7}$$

In the non-initialization process, the intermediate output value X' of formula (4) is calculated according to the second fusion coordinate $X_{k-1}$ and the traffic carrier inertial information U1. The second difference D2 of formula (5) is the difference between the updated global positioning coordinate $X_g$ and the intermediate output value X'. In formula (6), the Kalman gain K2 is not equivalent to 0. Therefore, in the non-initialization process, such as the formula (7), an updated first fusion coordinate $\overline{X}_K$ can be obtained.

In step S165, since the global positioning coordinate $X_g$ is not updated, the second coordinate fusion component 150 sets the second difference D2 as 0. Thus, in formula (7), the first fusion coordinate $\overline{X}_K$ and the intermediate output value X' are the same. In other words, in the non-initialization process, when the global positioning coordinate $X_g$ is not updated, the second coordinate fusion component 150 fuses the second fusion coordinate $X_{k-1}$ and the traffic carrier inertial information U1 and uses the fused coordinate (that is, the intermediate output value X') as the updated first fusion coordinate $\overline{X}_K$. Then, the method proceeds to step S160. Additionally, in step S165 of the flowchart of FIG. 2A, the second fusion coordinate $X_{k-1}$ includes the information of the global positioning coordinate $X_g$.

As indicated in FIG. 2B, following steps S155 and S165, the method proceeds to step S160.

Figure 5:
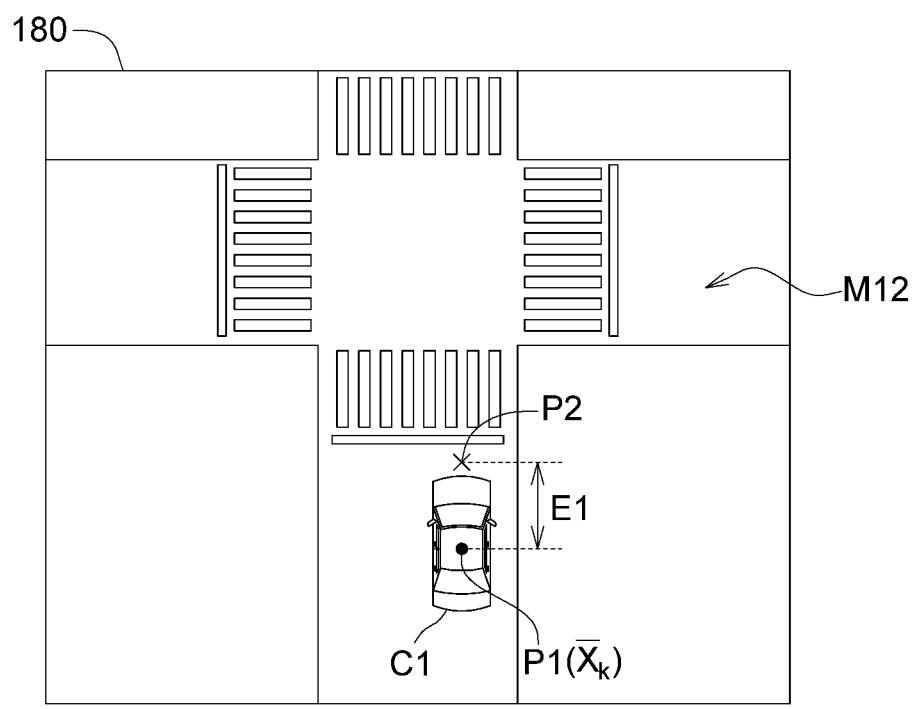
FIG. 5 is a frame of the display screen of FIG. 4 showing a map with an updated first fusion coordinate according to an embodiment of the disclosure.

In step S160, referring to FIG. 5, a frame of the display screen 180 of FIG. 4 shows a map with an updated first fusion coordinate $\overline{X}_K$ on the map M12. Since the updated first fusion coordinate $\overline{X}_K$ is fused with the information of the traffic mark feature M11, the positioning error E1 of FIG. 5 is much smaller than the positioning error E1 of FIG. 4. In an embodiment, the positioning error E1 of FIG. 5 can be reduced to centimeter level.

After step S160, the method proceeds to step S170. The determination method of step S170 is similar to or the same as that of step S130, that is, the mark feature analyzer 130 analyzes the traffic mark feature M11 in the captured image F1 and calculates the device coordinate $X_{cam}$ of the navigation and positioning device 100 according to the mark coordinate $X_m$, Detailed descriptions are not repeated here. In step S170, when the captured image F1 has the traffic mark feature M11, the method proceeds to step S175 and step S180 in order; otherwise, the method proceeds to step S185. The determination method of steps S175 and S180 are similar to or the same as that of step S135 and step S140 respectively, wherein in the step S140 or the step S180, the device coordinate $X_{cam}$ and a first fusion coordinate $\overline{X}_K$ are fused and the fused coordinate is set as a second fusion coordinate $X_k$. Detailed descriptions are not repeated here. In step S185, the controller 120 use the first fusion coordinate $\overline{X}_K$ as a second fusion coordinate $X_k$. Then, the method returns to step S150.

Then, like the non-initialization process, the navigation and positioning device 100 continues to perform steps S150 to S185 until the navigation and positioning device 100 shuts down or the navigation and positioning device 100 receives a positioning pause instruction.

In an embodiment, the navigator 190 arranges a path from the navigation and positioning device 100 to a destination (not illustrated) and performs navigation accordingly. During the navigation process, the positioning method of the disclosure recalculates the coordinate of the navigation and positioning device 100 according to each traffic mark feature M11 in the path, so that the coordinate of the navigation and positioning device 100 can be repeatedly calibrated to be close to the actual coordinate of the navigation and positioning device 100, and the traffic carrier C1 can precisely arrive at the destination.

The navigation and positioning device for detecting traffic mark of the disclosure uses a camera and a mark feature analyzer to capture a traffic mark or a stop line on the road surface of an intersection, and, in conjunction with a high-precision electronic map having the information of the marks on the road surface of the intersection, calibrates the error generated by the original GPS positioner and adjust the positioning information obtained using the original GPS positioning algorithm to achieve centimeter level positioning accuracy at the intersection.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A navigation and positioning device for detecting traffic mark, comprising:
   a storage storing map information, wherein the map information comprises a traffic mark feature and a mark coordinate of the traffic mark feature;
   a mark feature analyzer for analyzing whether a captured image has the traffic mark feature, analyzing the traffic mark feature in the captured image when the captured image has the traffic mark feature, calculating a relative position between the navigation and positioning device and a feature point of the traffic mark feature, and calculating a device coordinate of the navigation and positioning device according to the relative position;
   a first coordinate fusion component for fusing the device coordinate and a first fusion coordinate as a second fusion coordinate; and
   a second coordinate fusion component for fusing the second fusion coordinate, traffic carrier inertial information and a global positioning coordinate as an updated first fusion coordinate.

2. The navigation and positioning device according to claim 1, further comprising a controller, wherein in an initialization process, the controller sets the global positioning coordinate as the first fusion coordinate; when the navigation and positioning device is in the initialization process and the captured image has the traffic mark feature, the first coordinate fusion component fuses the device coordinate and the global positioning coordinate as the second fusion coordinate.

3. The navigation and positioning device according to claim 1, further comprising a controller, wherein when the navigation and positioning device is in the initialization process and the captured image does not have the traffic mark feature, the controller sets the global positioning coordinate as the second fusion coordinate.

4. The navigation and positioning device according to claim 1, wherein when the navigation and positioning device is in a non-initialization process and the global positioning coordinate is updated, the second coordinate fusion component fuses the second fusion coordinate, the traffic carrier inertial information and an updated global positioning coordinate as an updated first fusion coordinate.

5. The navigation and positioning device according to claim 1, wherein when the navigation and positioning device is in a non-initialization process and the global positioning coordinate is not updated, the second coordinate fusion component fuses the second fusion coordinate and the traffic carrier inertial information as an updated first fusion coordinate, wherein the second fusion coordinate comprises the global positioning coordinate.

6. The navigation and positioning device according to claim 1, further comprising a controller, wherein when the navigation and positioning device is in a non-initialization process, the global positioning coordinate is updated and the captured image does not have the traffic mark feature, the controller sets the first fusion coordinate as the second fusion coordinate.

7. The navigation and positioning device according to claim 1, wherein when the navigation and positioning device is in a non-initialization process, the global positioning coordinate is updated and the captured image has the traffic mark feature, the first coordinate fusion component fuses the device coordinate and the first fusion coordinate as an updated second fusion coordinate.

8. The navigation and positioning device according to claim 1, wherein the traffic mark is located at an intersection, and the mark feature analyzer is further for:
starting to analyze whether a captured image has the traffic mark feature when the navigation and positioning device approaches the intersection.

9. The navigation and positioning device according to claim 1, further comprising:
a global positioning system (GPS) positioner for providing a current global positioning coordinate to the navigation and positioning device.

10. The navigation and positioning device according to claim 1, wherein the traffic mark is a mark on the road surface.

11. The navigation and positioning device according to claim 1, wherein the traffic mark is at least one of a zebra crossing, a stop line, a turn zone, a parking grid and an arrow.

12. The navigation and positioning device according to claim 1, further comprising:
a display screen for displaying map of the map information related to the first fusion coordinate and displaying the first fusion coordinate in the map.

13. A navigation and positioning method for detecting traffic mark, comprising:
analyzing whether a captured image has a traffic mark feature by a mark feature analyzer, wherein the traffic mark feature and a mark coordinate of the traffic mark feature are stored in map information;
when the captured image has the traffic mark feature, analyzing the traffic mark feature in the captured image, calculating a relative position between the navigation and positioning device and a feature point of the traffic mark feature, and calculating a device coordinate of the navigation and positioning device according to the relative position;
fusing the device coordinate and a first fusion coordinate as a second fusion coordinate by a first coordinate fusion component; and
fusing the second fusion coordinate, a traffic carrier inertial information and a global positioning coordinate as an updated first fusion coordinate by a second coordinate fusion component.

14. The navigation and positioning method according to claim 13, further comprising:
setting the global positioning coordinate as the first fusion coordinate by a controller in an initialization process when the captured image has the traffic mark feature;
wherein in the step of fusion the device coordinate and the first fusion coordinate by the first coordinate fusion component, the first coordinate fusion component fuses the device coordinate and the global positioning coordinate as a second fusion coordinate.

15. The navigation and positioning method according to claim 13, further comprising:
setting the global positioning coordinate as a second fusion coordinate by a controller in an initialization process when the captured image does not have the traffic mark feature.

16. The navigation and positioning method according to claim 13, wherein the step of fusing the second fusion coordinate, the traffic carrier inertial information and the global positioning coordinate by the second coordinate fusion component further comprises:
in a non-initialization process, when the global positioning coordinate is updated, fusing the second fusion coordinate, the traffic carrier inertial information and an updated global positioning coordinate as an updated first fusion coordinate by the second coordinate fusion component.

17. The navigation and positioning method according to claim 13, wherein the step of fusing the second fusion coordinate, the traffic carrier inertial information and the global positioning coordinate by the second coordinate fusion component further comprises:
in a non-initialization process, when the global positioning coordinate is not updated, fusing the second fusion coordinate and the traffic carrier inertial information as an updated first fusion coordinate by the second coordinate fusion component, wherein the second fusion coordinate comprises the global positioning coordinate.

18. The navigation and positioning method according to claim 13, further comprising:
setting the first fusion coordinate as the second fusion coordinate by a controller in a non-initialization process when the global positioning coordinate is updated and the captured image does not have the traffic mark feature.

19. The navigation and positioning method according to claim 13, wherein the traffic mark is located at an intersection, and the navigation and positioning method further comprises:
starting to analyze whether a captured image has the traffic mark feature by the mark feature analyzer when approaching the intersection.

20. The navigation and positioning method according to claim 13, further comprising:
providing a current global positioning coordinate by a GPS positioner.

21. The navigation and positioning method according to claim 13, wherein the traffic mark is a mark on the road surface.

22. The navigation and positioning method according to claim 13, wherein the traffic mark is at least one of a zebra crossing, a stop line, a turn zone, a parking grid and an arrow.

23. The navigation and positioning method according to claim 13, further comprising:
displaying map of the map information related to the first fusion coordinate and displaying the first fusion coordinate in the map by a display screen.

* * * * *